United States Patent [19]

Ravve et al.

[11] 4,311,250

[45] Jan. 19, 1982

[54] CONTAINER HAVING INTERNAL WALL SURFACES MODIFIED TO REDUCE CARBONATION LOSS

[75] Inventors: Abraham Ravve, Lincolnwood; Paxton M. Wilt, Downers Grove, both of Ill.

[73] Assignee: The Continental Group, Inc., Stamford, Conn.

[21] Appl. No.: 148,089

[22] Filed: May 12, 1980

[51] Int. Cl.$^3$ .................. B65D 81/24; B65D 85/72

[52] U.S. Cl. .................. 220/458; 215/1 C; 426/106; 426/131; 426/398; 428/35; 220/1 BC

[58] Field of Search .......... 426/131, 398, 106, 126, 426/127; 220/458, 1 BC; 215/1 C, 12 R; 428/35

[56] References Cited

U.S. PATENT DOCUMENTS

| | | | |
|---|---|---|---|
| 2,268,757 | 1/1942 | Mark | 426/131 |
| 3,117,693 | 1/1964 | Vogel | 220/457 |
| 3,347,700 | 10/1967 | Gloyer et al. | 220/458 |
| 3,783,006 | 1/1974 | Hahn et al. | 220/458 |
| 3,804,663 | 4/1974 | Clark | 220/457 |
| 3,922,451 | 11/1975 | Anschutz et al. | 428/35 |
| 3,991,216 | 11/1976 | Christenson et al. | 220/1 BC |
| 4,069,933 | 1/1978 | Newing | 426/398 |
| 4,091,954 | 5/1978 | Wallace | 426/131 |
| 4,164,587 | 8/1979 | Borman | 220/458 |
| 4,165,304 | 8/1979 | Davis | 220/458 |

FOREIGN PATENT DOCUMENTS

| | | | |
|---|---|---|---|
| 54-126188 | 10/1979 | Japan | 428/35 |
| 55-12026 | 1/1980 | Japan | 220/458 |

*Primary Examiner*—Steven L. Weinstein
*Attorney, Agent, or Firm*—Paul Shapiro; Joseph E. Kerwin; Charles E. Brown

[57] ABSTRACT

A container is provided for liquid carbonated beverages having applied to the internal wall surfaces a layer of an inert, water insoluble polymeric material comprised of a predominant amount of hydrophilic groups, the presence of such hydrophilic groups in the polymer being effective to reduce carbon dioxide bubble nucleation and accompanying carbonation loss from carbonated beverages packaged therein.

16 Claims, No Drawings

CONTAINER HAVING INTERNAL WALL SURFACES MODIFIED TO REDUCE CARBONATION LOSS

BACKGROUND OF THE INVENTION

1. Field of Invention

The present invention pertains to a container for carbonated beverages and more particularly, it pertains to a container having applied to the internal beverage contacting wall surface an inert, water insoluble polymeric layer which suppresses carbonation loss from beverages packaged therein.

2. Prior Art

Metal containers used for the packaging of carbonated beverages such as beer and soft drinks have applied to the internal wall surfaces an inert, water resistant or hydrophobic polymeric organic coating which protects the metal surface from corrosive attack by the carbonated beverage packaged therein. It has been observed that upon the filling of these metal containers with the carbonated beverage product and also when the sealed containers are subsequently opened, carbonation is lost relatively rapidly and the beverage may acquire a flat taste. High carbonation loss from the carbonated product of newly opened metal containers as well as from plastic bottles formed from synthetic organic resins such as polyethylene terephthalate is quite typical. The carbonation loss rate may be so great that the liquid actually "gushes" out when the container is opened.

The art has attempted to eliminate the carbonation loss problem by coating the internal surface of the containers with oleic acid, e.g., U.S. Pat. No. 4,069,933, or glycerol, e.g. U.S. Pat. No. 4,091,954. These prior art attempts at reducing carbonation loss have not been entirely successful as the coating material has either imparted an off-flavor and/or odor to the carbonated beverage or the reduction in carbonation loss is inconsistent due to the transient nature of the coating material.

In a study by the present inventors of $CO_2$ loss occurring when carbonated beverage containers are opened for use, it was found that higher rates of loss occur when the beverage is packaged in metal containers internally coated with inert hydrophobic organic polymeric materials or bottles formed from hydrophobic thermoplastic resins such as polyethylene terephthalate (PET) as compared with glass containers. It was concluded that the greater loss rate was due to the differences in roughness and water repellancy of the hydrophobic polymeric surfaces as compared with glass surfaces.

Glass is an inorganic material which is quite hydrophilic and is a relatively smooth surfaced product. Water wets clean glass surfaces well. Due to their chemical composition, polymeric materials such as the vinyl halide polymers typically used as metal container coatings and the thermoplastic resins used in bottle manufacture, e.g., polyethylene, polyvinyl chloride and PET are quite hydrophobic, with the result that water exhibits poor wettability to those materials. Also relative to glass surfaces, the surface of these polymeric materials is not smooth and has many microscopic imperfections and fissures. Due to the poor water wettability of these polymeric materials, upon filling containers in which the exposed internal wall surfaces are composed of such hydrophilic materials, gas entrapment occurs within the microscopic fissures in the polymeric surface. If the surface is hydrophilic, water flows into the fissures and displaces the trapped gas.

Gas entrapped in the fissures present in the polymeric surfaces serves as a nucleus for bubble formation and growth and subsequent carbonation loss when the beverage container is opened.

Excessive bubble nucleation causes the carbonated beverage to gush out of the container when the container is opened for use which is very undesirable from the consumer standpoint.

SUMMARY OF THE INVENTION

According to the present invention, there is provided a container for packaging carbonated beverages having its internal liquid contacting wall surfaces modified with an inert, insoluble polymeric layer containing hydrophilic chemical groups the presence of such layer being effective to reduce carbon dioxide bubble nucleation and accompanying carbonation loss from carbonated beverages packaged therein.

It is critical to the practice of the present invention that a major portion of the liquid contacting internal container wall surface i.e. about 50% or more of the internal wall surface area be modified with the polymeric layer to effect a substantial reduction in carbonation loss.

The polymeric layer applied to the internal wall surface of the container provides a hydrophilic surface within the container interior whereby the water wetting of the surface is increased with a proportionate decrease in $CO_2$ bubble nucleation and carbonation loss. By the practice of the present invention, $CO_2$ bubble nucleation is reduced to a level approaching that of glass by modifying the wall surfaces with an inert, insoluble, permanently affixed polymeric layer which does not impair the taste or otherwise degrade the packaged carbonated beverage.

PREFERRED EMBODIMENTS

In practicing the present invention, the internal wall surfaces of the container can be coated with an insoluble, polymeric organic coating material having a high concentration e.g. at least about 75% by weight of a hydrophilic monomer component such as acrylic acid. Alternatively a hydrophilic monomer can be graft polymerized onto the surface of a non-hydrophilic or hydrophobic coating affixed to the container wall surface whereby substantially the entire exposed surface of the hydrophobic material is rendered hydrophilic.

Examples of insoluble polymeric coating materials which can be used in the practice of the present invention include polymers or copolymers of alpha, beta ethylenically unsaturated hydrophilic monomers wherein the polymer or copolymer is comprised of at least about 75% by weight of the hydrophilic monomer. Hydrophilic monomers within the meaning of the present invention include carboxyl containing monomers such as alpha, beta ethylenically unsaturated carboxylic acids having 2 to 8 carbon atoms such as acrylic acid, methacrylic acid and itaconic acid, anhydride containing monomers such as maleic anhydride and itaconic acid anhydride, amide containing monomers such as acrylamide, methacrylamide, hydroxyl containing monomers such as hydroxyalkyl acrylates such as hydroxy ethyl acrylate, hydroxypropyl acrylate, or monomers containing a pyrrolidone group such as an N-vinyl pyrrolidone.

Monomers which may be copolymerized with the hydrophilic monomers enumerated above include alkyl esters of an alpha, beta-ethylenically unsaturated carboxylic acid, such as an alkyl acrylate or an alkyl methacrylate, or which may be a vinyl aromatic hydrocarbon. Alkyl acrylates and methacrylates which may be utilized to prepare the copolymeric coating compositions include the ethyl, methyl, propyl, butyl, hexyl, ethyl-hexyl, and lauryl acrylates and methacrylates as well as similar esters having up to about 20 carbon atoms in the alkyl group. The vinyl aromatic hydrocarbon, if one is employed, is usually styrene, an alpha-alkyl styrene, or vinyl toluene. Preferably, these copolymer coating compositions contain about 75 to about 95% by weight of the hydrophilic chemical group containing monomer, about 5 to about 25% by weight of the alkyl acrylate and 0 to 25% by weight of the vinyl aromatic hydrocarbon.

The copolymers are produced from the above monomers using conditions and catalysts conventionally employed in preparing acrylate and methacrylate polymers. Thus, for example, the catalyst is ordinarily a free radical catalyst, such as cumene hydroperoxide, benzoyl peroxide, ammonium persulfate, azo-bis-isobutyronitrile or the like, and the polymerization temperature is commonly between about 65° C. and 140° C. The solvents used in making these copolymers include aliphatic hydrocarbons, alcohols, esters, ketones and similar materials.

Polymers prepared using hydrophilic monomer concentrations of 75% by weight or more may become water soluble. Water soluble polymers having a high degree of hydrophilicity are also useful in the practice of the invention. Examples of these polymers include poly (vinyl alcohol), etherified starches, etherified cellulosics and sulfonated polystyrenes. As it is necessary that the polymeric materials used in the practice of the present invention be water insoluble in order to be operable for use in surface contact with liquid carbonated beverages, after application to the container surface of the water soluble polymeric material, the polymer is cross-linked sufficiently to insolubilize the polymer. It is well within the skill of the art to select the proper cross-linking agents to effect the insolubilization of the polymeric materials. For example polyacrylamide, which is water soluble may be insolubilized by cross-linking the polymer with a urea-formaldehyde resin. Poly (vinyl alcohol) can be insolubilized by cross-linking with aldehydes such as formaldehyde or glyoxal. Other useful cross-linking agents include polyepoxides such as butadiene diepoxide, polyamide epichlorohydrin resin and acyl halides such as adipoyl chloride, sebacoyl chloride. In applying the cross-linking agents to insolubilize the polymer, the less reactive agents are added in admixture with the coating solution containing the polymer. In the case of more reactive cross-linking agents, the polymers are applied to the container internal wall surface and subsequently treated with the cross-linking agent in a separate treating step.

In cross-linking the water soluble polymer it is critical that the polymer be sufficiently cross-linked to render it insoluble but not to the extent that the polymer loses its affinity for water. Generally this can be accomplished by cross-linking about 5 20% of the functional groups on the polymer backbone. To effect cross-linking the water soluble polymer and the cross-linking agent are heated at 200°–425° F. for a time sufficient e.g. 10 to 30 minutes to effect insolubilization of the polymer.

The hydrophilic coating compositions can be applied to the internal walls of beverage containers by various methods, such as dipping, spraying, roll coating, coil coating or brushing. The method of application usually determines the choice of solvents. For example, more volatile solvents, such as methyl ethyl ketone, are included in compositions to be sprayed, whereas butyl cellosolve or other higher boiling solvents are included in compositions to be roll coated.

The coating compositions are applied at a solids concentration of about 5 to about 50% by weight in thicknesses as low as 1 to 5 milligrams per square inch, and preferably 3 to 7 milligrams per square inch.

After application, the coatings are cured by heating at elevated temperatures. A convenient curing schedule is 5 to 10 minutes at 325° F., with higher temperatures requiring shorter times and lower temperatures longer times, particularly when a cross-linking reaction is involved.

The internal surface of the container may also be rendered hydrophilic in accordance with the practice of the present invention wherein an ethylenically unsaturated monomer containing a hydrophilic chemical group is graft copolymerized and incorporated onto the backbone of a hydrophobic polymeric substrate. Such graft copolymers are advantageously applied to container wall surfaces by preparing mixtures comprising a solution or dispersion of the monomer and a polymerization catalyst and then applying the mixture to the hydrophobic polymer surface, e.g., a previously coated container internal wall surface, in the same manner as the hydrophobic polymer coating is originally applied to the container wall i.e. by dipping or spraying, to bring the monomer into contact with the hydrophobic substrate. After application of the monomer mixture, the monomer wetted hydrophobic polymer substrate is exposed to polymerization actuating means such as source of ultraviolet radiation, ionizing radiation or catalytic agents such as those used in peroxide initiated polymerization reactions previously mentioned for acrylate polymers which are incorporated in the monomer mixture whereby the monomer is graft polymerized onto the hydrophobic polymer surface.

If the hydrophilic monomers are grafted onto the hydrophobic surface using ultraviolet radiation as the polymerization initiator, the presence in the monomer mixture of photosensitizers such as benzophenone, 4,4-dimethyl benzophenone, chlorothioxanthone and benzoin at concentrations of 0.001 to 0.1% by weight is desirable.

After the graft polymerization reaction is completed, the graft polymerized surface is washed to remove ungrafted or unreacted monomer and is then dried.

In graft polymerizing the hydrophilic monomer onto the hydrophobic surface it advantageous that at least 0.1 milligram (mg.) of monomer be grafted per square inch of container wall surface and preferably about 0.75 to about 2 mg/in$^2$ of container wall surface.

The present invention is illustrated by the following Examples:

EXAMPLE I

A hydrophobic polyvinyl chloride base coat previously applied to an aluminum container substrate was rendered hydrophilic by graft polymerizing acrylic acid onto the surface of the polyvinyl chloride coating surface in the following manner:

A mixture of acrylic acid monomer and a glycerine dispersant at a weight ratio of 1:1 was prepared. Trace quantities (0.001%) of benzophenone were added and the mixture was applied to the inside walls of a 2 liter aluminum container having previously applied thereto a polyvinyl chloride polymer base coat, the mixture being applied in sufficient quantities to thoroughly wet the entire container wall surface. The wetted surface was then exposed to and irradiated with ultra-violet light from a medium-pressure mercury lamp for about one minute. Rapid polymerization of acrylic acid occurred. All excess material was then washed off with water leaving a residual inert, insoluble film of polyacrylic acid chemically grafted to the surface of the polyvinyl chloride coating. It was estimated that the total surface of the polyvinyl chloride base coat was completely covered by the polyacrylic acid grafted film.

To determine the rate of $CO_2$ loss from carbonated beverages packaged in the containers internally coated with the acrylic acid/polyvinyl chloride graft copolymer prepared above, the following test was performed at room temperature:

The acrylic acid/polyvinylchloride graft copolymer coated container was placed in a pressure vessel which enclosed the open container. The pressure vessel was equipped with the piping, valves and pressure recording devices whereby a carbonated beverage saturated at 4.0 volumes carbonation was fed into the open container without loss of $CO_2$ from the beverage. After the carbonated beverage had been transferred to the container, the vessel was allowed to stand at room temperature. The $CO_2$ pressure in the vessel head space was vented to atmospheric pressure through a vent valve to simulate opening of the container. Thereafter the vent valve was closed to reseal the vessel. Immediately upon reclosing the vessel and headspace pressure was zero pounds per square inch gauge (psig). The vessel was allowed to remain undisturbed for 45 minutes, during which time $CO_2$ gas was lost to the headspace and the headspace gas pressure increased to 7.3 psig. At this time the vessel was shaken to produce equilibrium and the equilibrium pressure was determined to be 17.8 psig. The ratio of the pressures between the first and second pressure readings was determined to be 0.41 and when multiplied by 100 provided a measure of carbonation loss from the container as 41% of possible $CO_2$ loss in 45 minutes.

By way of contrast when the test procedure of Example I was repeated with the exception that the coated surface of the container was not modified with an acrylic acid graft, 85% of possible $CO_2$ loss occured in 45 minutes.

EXAMPLE II

The procedure of Example I was repeated except the hydrophobic substrate onto which acrylic acid was to be graft polymerized was the inner surface of a transparent 2 liter bottle blow molded from PET. The bottle having the interior surface wetted with the photopolymerizable mixture was irradiated with an ultra-violet source from the outside. The amount of acrylic acid grafted on the PET surface was determined to be 0.8 milligrams acrylic acid per inch square ($in^2$) PET surface which completely covered the interior PET surface.

The % of possible $CO_2$ loss in 45 minutes was determined to be 22%.

By way of contrast the possible $CO_2$ loss in 45 minutes from a PET bottle which had not been interiorly surface modified with acrylic acid was determined to be 45%.

A second test was performed to measure the increase in the hydropholic nature of the PET surface effected by the acrylic acid modification of the interior surface of the PET bottle.

In this second test, the advancing contact angle of distilled water on the surface of a sample cut from the acrylic acid modified PET bottle wall was measured. A decrease in the advancing contact angle was a measure of the increase in hydrophilic nature of the internal wall surface of the PET bottle.

In making the measurement a water bubble was deposited (using a syringe) onto the surface of the PET sample to be measured for hydrophilicity. The angle of the bubble in contact with the PET wall surface measured with a goniometer telemicroscope. The lower the advancing contact angle the more hydrophilic is the PET surface as water tends to flow out more readily on a hydrophilic surface than on a hydrophobic surface. Measurements were made on dry PET wall surfaces as well as wall surfaces which had been previously soaked in distilled water. For a given surface, the advancing contact angle will vary somewhat with surface contamination and the position of the bubble on the surface, however the trend of the contact angle measurement, i.e., the amount of relative decrease in the angle is considered more meaningful in assessing the level of hydrophilicity then the actual measured angle.

Measurement of the advancing contact angle of the sample of the acrylic acid graft copolymerized PET surface cut from the bottle indicated an advancing contact angle of 25° on a dry wall surface and less than 15° on a previously soaked PET surface demonstrating a high level of hydrophilicity.

By way of contrast the advancing contact angle of the unmodified internal wall surface of a similar PET bottle was found to be 82° on a dry wall surface and 75° on a previously soaked PET surface (hereinafter referred to as "soaked" surface) indicating a substantially lower degree of hydrophilicity.

EXAMPLE III

The procedure of Example II was repeated with the exception that hydroxyethyl acrylate was substituted for acrylic acid and a solution of the hydroxyethyl acrylate containing 0.01% chlorothioxanthone was prepared and the solution was used to wet the interior PET bottle surface. Irradiation was then carried out from the container exterior for approximately 10 seconds with a medium pressure (100 watts/in.) mercury lamp. All excess unreacted monomer was then washed out of the bottle with water. Using this procedure a film of 0.1 mg/$in^2$ hydroxyethyl acrylate was grafted on the PET surface.

The possible $CO_2$ loss in 45 minutes from the hydroxyethyl acrylate modified PET bottle was determined to be 22%.

The advancing contact angle of the hydroxyethyl acrylate modified PET surface was found to be 21° for a "soaked" surface, and 59° for a dry surface.

EXAMPLE IV

An acrylic acid graft copolymer of a terpolymer of vinyl chloride, vinyl acetate and vinyl alcohol (VAGH resin) was prepared in the following manner: 50 grams (g) of the VAGH resin were dissolved in 250 milliliters (ml) of methyl ethyl ketone and 100 ml of butyl cellosolve was then added along with 100 g. of acrylic acid and 3 g. of benzoyl peroxide. The reaction mixture was heated and stirred under $N_2$ atmosphere for 4 hours at 80° C. in a 3-necked reaction flask equipped with a mechanical stirrer, reflux condenser and a heating mantle. When the reaction was complete the viscous solution was reduced in viscosity with 250 ml of isopropyl alcohol and applied as a top coat to the internal wall surfaces of separate 2 liter aluminum containers separately interiorly base coated with a polyvinylchloride coating and an epoxy-phenolic coating of the type normally used in coating the interior surfaces of metal beverage containers. The containers were then baked at approximately 340° F. for 10 minutes to harden the acrylic acid/VAGH graft copolymer top coating.

Two containers interiorly base coated with polyvinyl chloride and top coated with the acrylic acid/VAGH graft copolymer had a possible $CO_2$ loss in 45 minutes of 27% and 22% respectively. Another container base coated with the epoxy-phenolic resin and top coated with the acrylic acid/VAGH graft copolymer had a possible $CO_2$ loss in 45 minutes of 38%.

Containers having either a polyvinyl chloride base coat or an epoxy phenolic base coat which had not been top coated with the acrylc acid/VAGH coating all exhibited a possible $CO_2$ loss of 85% when tested 10 minutes after filling.

EXAMPLE V

Acrylic acid was grafted onto a VAGH base coat previously applied to the internal walls of a series of 12 ounce aluminum containers wherein a polymerization mixture containing 30 g. of acrylic acid per 100 g. of isopropyl alcohol and 0.9 g. of benzoyl peroxide was added to the container and the container heated in a constant temperature bath at 70° C. with $N_2$ bubbling through the liquid. The polymerization mixture was heated for varying time periods of 4 to 8 hours in each container in the series to vary the concentration of acrylic acid grafted onto the VAGH base coat surface. Thereafter the containers were cooled to room temperature, and washed to remove any unreacted monomer mixture. The containers were evaluated to determine the effect on $CO_2$ loss reduction as well as to determine the effect of the acrylic acid concentration on the hydrophilic nature of the acrylic acid modified base coat surface. Coating continuity studies had previously indicated that a minimum of 2.0 mg/in² of any coating material is required to yield 100% coverage of a flat surface to be coated.

The results of these evaluations are recorded in Table I below:

TABLE I

| Film wt. of Acrylic Acid Grafted on VAGH | Advancing Contact Angle Dry | Advancing Contact Angle Soaked | Possible $CO_2$ Loss in 45 Min. |
| --- | --- | --- | --- |
| 0 mg/in² | 85° | 83° | 55% |
| 0.13 mg/in² | 74° | 49° | 45% |
| 0.27 mg/in² | 69° | 17° | 40% |
| 1.09 mg/in² | 58° | <15° | 27% |

EXAMPLE VI

Polyvinyl alcohol (PVA) as a 10% by weight water solution was applied as a top coat over a VAGH base coat previously applied to a 12 ounce aluminum container and cross-linked to varying levels with a solution of 20% glyoxal in water. The amount of cross-linking was varied by varying the ratio of PVA to glyoxal. The wet applied solution was baked at 340° F. for about 20 minutes in a high air velocity oven to effect glyoxal cross-linking of the PVA.

Containers having the cross-linked PVA top coat applied to the VAGH base coat were evaluated to determine the effect of the top coat on $CO_2$ loss suppression as well as to determine the effect of cross-linked PVA on the hydrophilic nature of the VAGH base coat surface. The results of these evaluations are summarized in Table II below:

TABLE II

| Film Weight of PVA Applied over VAGH | Volume Ratio of PVA to Glyoxal Solutions | Advancing Contact Angle Dry | Advancing Contact Angle Soaked | Possible $CO_2$ Loss in 45 Min. |
| --- | --- | --- | --- | --- |
| 2.9 mg/in² | 9:1 | 107° | 24° | 49%* |
| 1.8 mg/in² | 49:1 | 102° | 10° | 41% |
| 2.6 mg/in² | 199:1 | 94° | <10° | 27% |

*High degree of cross-linking reduces hydrophilicity of the surface.

What is claimed is:

1. A container for liquid carbonated bverages comprising a hollow body having applied to the internal liquid contacting internal wall surfaces thereof a layer of an inert, water insoluble organic polymeric material wherein at least about 75% by weight of the layer being formed from a monomer containing hydrophilic chemical groups, the layer covering at least a major portion of the internal liquid contacting wall surfaces and present in an amount both effective to reduce carbon dioxide bubble nucleation on the internal walls of the container and accompanying carbonation loss from the beverage packaged therein.

2. The container of claim 1 wherein the container is formed from a metal.

3. The container of claim 2 wherein the container is formed from aluminum.

4. The container of claim 1 wherein the container is formed from steel.

5. The container of claim 1 wherein the container is formed from polyethylene terephthalate.

6. The container of claim 1 wherein the layer is formed of a copolymer of a hydrophilic containing monomer and a second monomer.

7. The container of claim 1 wherein the layer is formed of a hydrophobic polymer modified by graft polymerization with the monomer containing hydrophilic chemical groups.

8. The container of claim 7 wherein the hydrophobic polymer is polyvinyl chloride.

9. The container of claim 7 wherein the hydrophobic polymer is a vinyl chloride/vinyl acetate/vinyl alcohol copolymer.

10. The container of claim 7 wherein the film weight of the graft polymerized hydrophilic monomer ranges from 0.10 to 2.0 milligrams of monomer grafted per square inch of container wall surface.

11. The container of claim 10 wherein the polyvinyl alcohol is insolubilized with glyoxal.

12. The container of claim 7 wherein the film weight of the graft polymerized hydrophilic monomer ranges from 0.75 to 2.0 milligrams of monomer grafted per square inch of container wall surface.

13. The container of claim 1 wherein the hydrophilic monomer is acrylic acid.

14. The container of claim 1 wherein the hydrophilic monomer is hydroxyethyl acrylate.

15. The container of claim 1 wherein the layer is a water soluble polymer insolubilized with a cross-linking agent.

16. The container of claim 15 wherein the polymer is polyvinyl alcohol.

* * * * *